United States Patent [19]

Potter et al.

[11] 3,784,261
[45] Jan. 8, 1974

[54] ARTICLE TRANSFER APPARATUS
[75] Inventors: Terry C. Potter, Sylvania; Roger R. Rhoads, Toledo, both of Ohio
[73] Assignee: Owens-Illinois, Inc., Toledo, Ohio
[22] Filed: Nov. 6, 1972
[21] Appl. No.: 304,066

Related U.S. Application Data
[62] Division of Ser. No. 155,005, June 21, 1971.

[52] U.S. Cl............... 302/2 R, 214/1 BT, 302/11, 302/27, 425/437
[51] Int. Cl............................................. B65g 51/02
[58] Field of Search................. 198/32; 214/1 BT; 302/2 R, 11, 12, 27; 425/437

[56] References Cited
UNITED STATES PATENTS
3,187,875  6/1965  Krupka ............................ 198/32
2,930,475  3/1960  Muhlenbruch ................... 198/32
3,273,723  9/1966  Andersen ..................... 214/1 BT
3,719,396  3/1973  Van De Walker et al. ...... 302/2 R Primary Examiner—Evon C. Blunk
Assistant Examiner—W. Scott Carson
Attorney—J. R. Nelson et al.

[57] ABSTRACT

Article transfer apparatus for cyclically transferring articles from an article forming machine, such as a plastic injection molding machine, to an adjacent article receiving chute or conveyor system. The transfer apparatus is mechanically linked to and driven by relative movement of platens on the forming machine to positively interlock the forming and transfer mechanisms against interference with each other. A control system operated by mechanical elements of the transfer system is employed to control the application of pressure or vacuum to article handling elements of the system at appropriate points in the cycle to enable the elements to grip, release or convey the article being handled.

6 Claims, 8 Drawing Figures

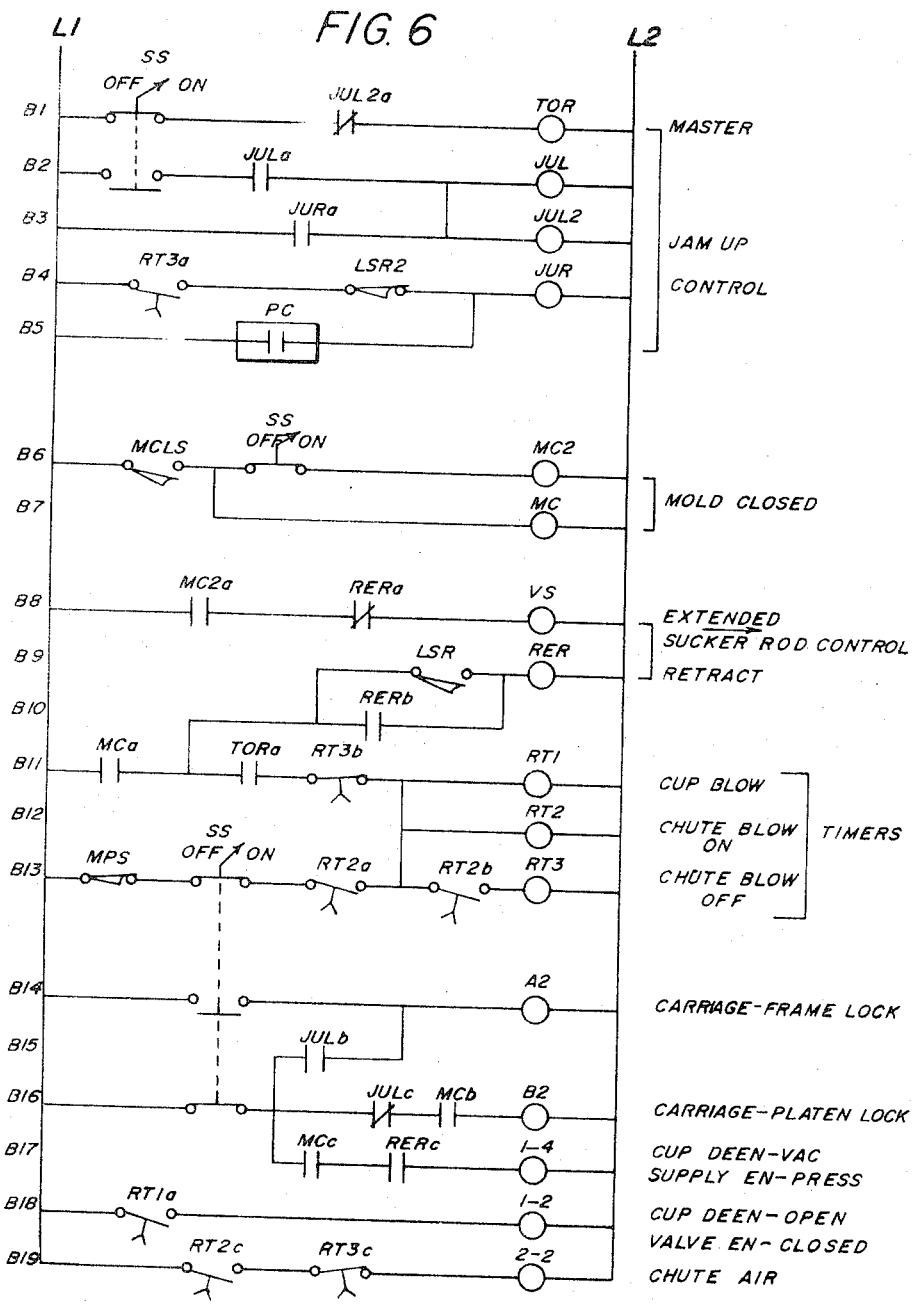

ARTICLE TRANSFER APPARATUS

REFERENCE TO RELATED APPLICATIONS

This application is a division of our pending application, Ser. No. 155,005, filed June 21, 1971. The present invention also relates to certain improvements in a part removal apparatus which forms the subject matter of a commonly-owned co-pending application of Paul R. Guest et al., Ser. No. 135,926, filed Apr. 21, 1971 now U.S. Pat. No. 3,734,666, this latter application being a continuation-in-part of a commonly owned Guest et al. application Ser. No. 846,087, filed July 30, 1969, now abandoned.

SUMMARY OF THE INVENTION

Although capable of employment in many other environments, the transfer apparatus of the present invention was specifically designed for the purpose of removing molded articles from an injection molding machine and feeding the articles in an oriented position into the inlet end of a conveying system through which the parts are fed to an assembly station. The molded article handled by the present system is a cup shaped plastic base element whose ultimate use is that of the supporting element of a composite container of the type disclosed in U. S. Pat. No. 3,372,826.

Although specifically designed for use in the foregoing environment, the invention is applicable to many types of article forming machines in which, as in an injection molding machine, a pair of article forming platens are mounted for movement relative to each other between a closed article-forming position and an open article-releasing or ejecting position. In the present invention, the relative movement which occurs between the two platens while opening and closing is employed to drive a part handling cup or holder downwardly between the opening platens to grip or grasp the freshly formed part and to carry the part clear of the platens by the closing movement of the platens. A mechanical drive arrangement is employed to positively interlock motion of the part holding cup with that of the platens.

While the platens are closed during the next article forming cycle, the parts are transferred from the cup into a pneumatic chute through which the parts are blown into the inlet end of a stationary pneumatic conveyor which feeds the received parts along their path toward the assembly station. The transfer of the parts from the cup to the chute and thence to the receiving conveyor is performed while the platens are closed during the article forming cycle. Because the article forming cycle will normally require some time to complete, the major portion of the time required for the part transfer cycle is overlapped with the time required to form the next article.

In the specific embodiment to be described below, the parts being handled are of relatively light weight, and a pressure-vacuum system is operatively connected to supply vacuum or pressure to the part holding cup to respectively grip or eject the part. The cup is constructed to sealingly engage a surface of the part at the mouth of the cup, and thus the application of pressure or vacuum to the interior of the cup provides a convenient method of handling the part.

A control system operated by the relative position of the platens or other mechanical elements of the apparatus is employed to supply pressure or vacuum at appropriate points in the cycle to the cup and to control the operation of a set of sucker rods which assist in the transfer of the part from the cup to the interior of the pneumatic chute.

Other objects and features of the invention will become apparent by reference to the following specification and to the drawings.

IN THE DRAWINGS

FIG. 6 is a schematic diagram of an electrical control circuit employed in the apparatus;

Figure 1:
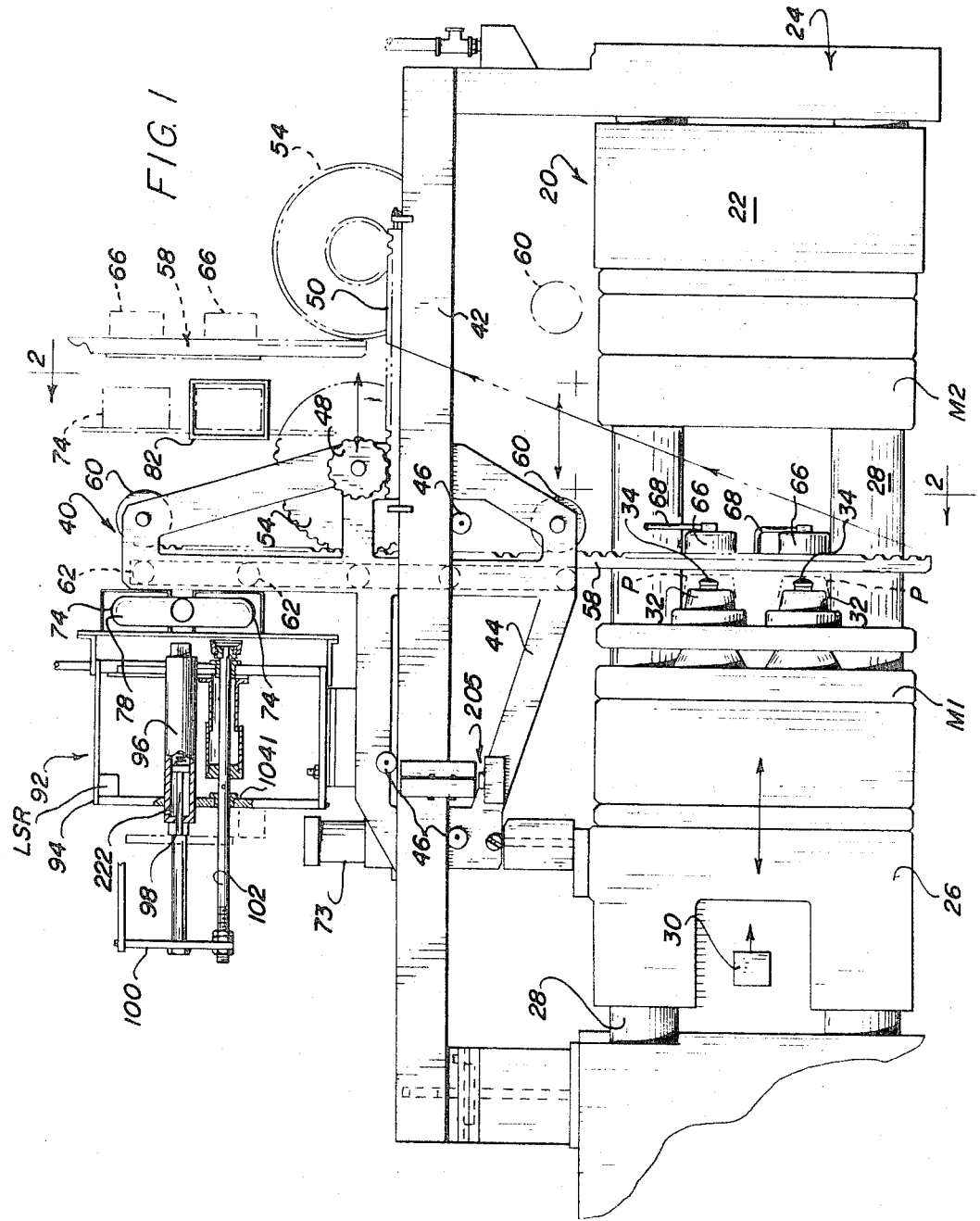
FIG. 1 is a side elevational view of one form of the present invention shown as being applied to an automatic injection molding machine.

Referring first to FIGS. 1–5, one form of mechanism embodying the present invention is disclosed as being used in conjunction with an automatic injection mold employed to cyclically form plastic cup shaped base element components for subsequent assembly into the composite container of U.S. Pat. No. 3,372,826. The molding machine, shown most clearly in FIG. 1, is designated generally 20 and is of a well-known commercially available construction. Only portions of the machine 20 necessary for an understanding of the present invention have been illustrated, these elements including a stationary platen 22 fixedly mounted upon a machine frame 24 and a movable platen 26. Platen 26 is supported for reciprocatory movement by four or more guide rods 28 mounted in machine frame 24 and is driven in cyclic reciprocatory movement by an automatically operable drive mechanism schematically illustrated at 30. Platens 22 and 26 carry mating mold halves M1, M2 constructed in accordance with the article or part which is to be formed. In the embodiment disclosed, movable platen 26 carries the male or core portion 32 of the mold, which forms the interior surfaces of the cup shaped part P while mating cavities, not shown, which form the exterior surfaces of part P are carried in the mold half mounted on stationary platen 22. Mold half M1 also includes ejector pins 34 mounted within cores 32 for partially ejecting the formed parts P from the cores as the mold halves reach their fully opened position, shown in FIG. 1. The mold disclosed in this application is arranged to simultaneously produce four base elements P, the individual molds having their center lines located on the corners of a square in the pattern best shown in FIG. 2.

The transfer apparatus includes a carriage designated generally 40 which is mounted on a pair of support rails 42 fixedly supported upon frame 24 and extending horizontally above the platens in a direction parallel to the direction of movement of movable platen 26. With certain exceptions described in detail below, carriage 40 is quite similar to structure disclosed in the aforementioned Guest et al. application Ser. No. 135,926 now U.S. Pat. No. 3,734,666 and these common structural details will be described only generally here. For further details of the carriage structure, reference may be had to the aforementioned Guest et al. application Ser. No. 135,926 now U.S. Pat. No. 3,734,666.

Figure 2:
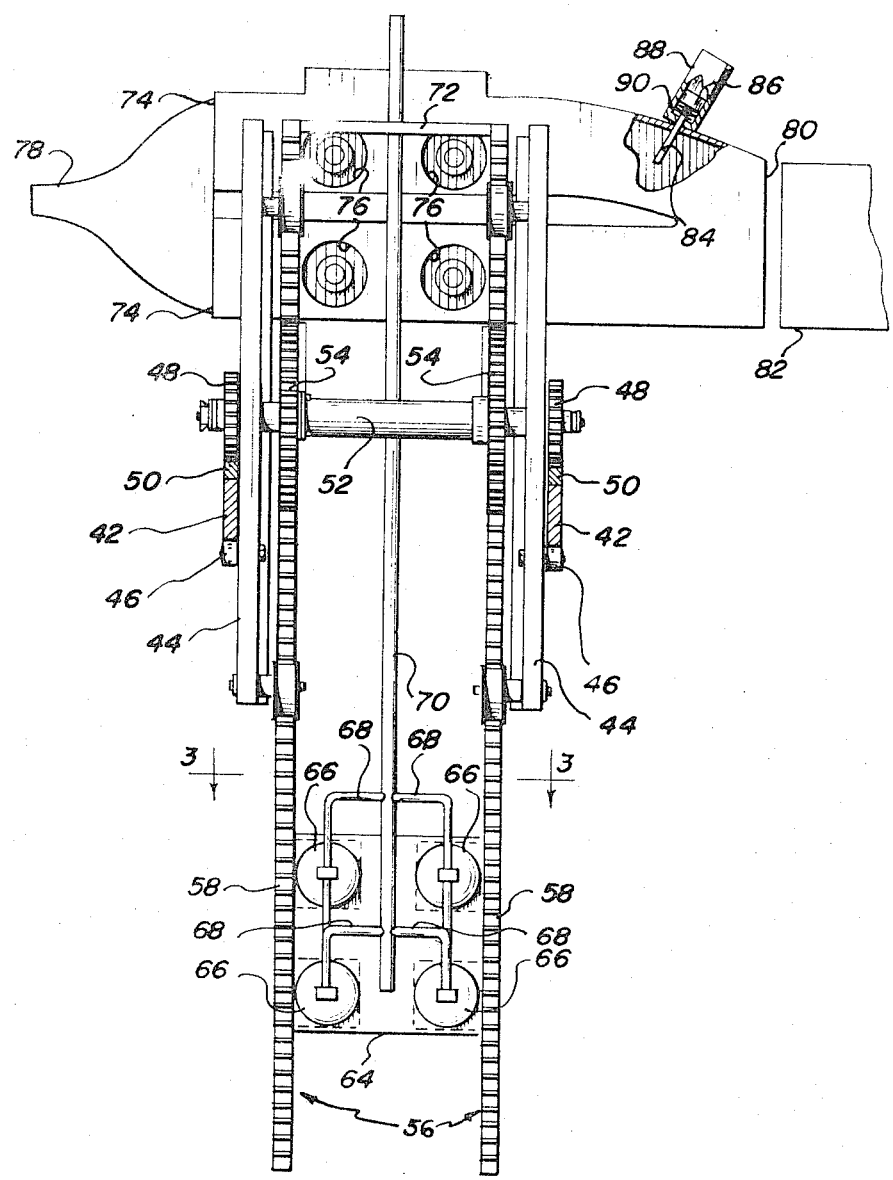
FIG. 2 is a cross sectional view of the apparatus of FIG. 1 taken approximately on the line 2—2 of FIG. 1.
Figure 3:
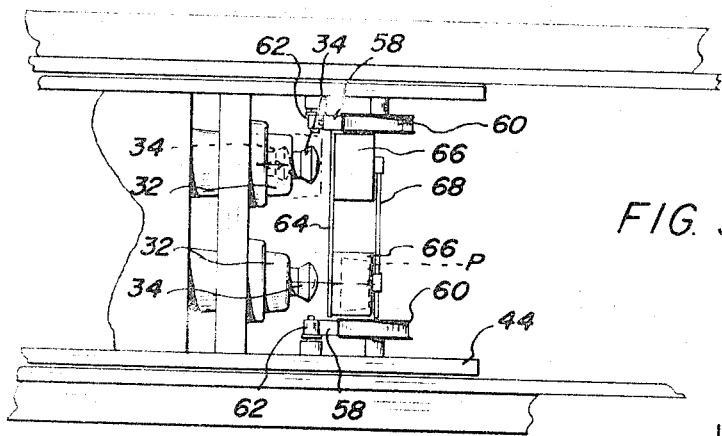
FIG. 3 is a detailed cross sectional view taken approximately on line 3—3 of FIG. 2.

Carriage 40 includes a pair of side frame members 44 which lie in vertical planes immediately inside of support rails 42 and which are rigidly interconnected to each other by suitable cross frame members. Suitably located rollers 46 engage the upper and lower surfaces of support rail 42 and are rotatably mounted in side frames 44 of the carriage to support the carriage for movement along rails 42. Also rotatably journaled in each of said side frame members 44 is a pinion gear 48 which is meshed with a gear rack section 50 fixedly mounted upon each rail 42. As best seen in FIG. 2, pinions 48 are mounted at the opposite ends of a main shaft 52 which is rotatably journaled in the respective side frame members 44. At the inner side of each frame member 44, a relatively large second pinion 54 is fixedly secured to shaft 52.

Referring now particularly to FIG. 2, a ladder-like vertical rack assembly designated generally 56 is mounted upon the carriage for vertical reciprocation between the carriage side frame members 44. Rack assembly 56 includes a pair of vertical rack members 58 whose teeth are meshed with the respective larger pinion gears 54 and which are supported and guided in movement upon the carriage by support rollers 60 and 62 which respectively engage the toothed and smooth sides of rack members 58. At their lower ends, rack members 58 are interconnected by a cup holder frame 64 which supports four part holding cups 66 arranged in a pattern corresponding to that of the four individual molds. Each of cups 66 is conformed in shape to the outer surface of the part P and branch conduits 68 connect the bottom of the interior of each cup 66 to a main supply conduit 70 through which pressure or vacuum may be selectively supplied to the interior of the cup. A rigid cross member 72 is secured between the upper ends of each of rack members 58.

Carriage 40 is normally locked by structure including a pneumatic motor 73 to movable platen 26 for movement back and forth with the platen. Motor 73 and other structures described in detail in the aforementioned Guest et al. application Ser. No. 135,926 may be actuated to unlock carriage 40 from platen 26 and lock the carriage to the fixed frame. When locked to platen 26 movement of platen 26 drives carriage 40, thereby causing stationary racks 50 to drive the outer pinions 48 and the consequent rotation of inner pinions 54 driving rack assembly 56 upwardly on closing movement of the platen and downwardly during opening movement of the platens. Movement of vertical rack assembly 56 is interlocked with that of the platens so that when the platens are in their fully opened position, shown in FIG. 1, the four part holding cups 66 are located in adjacent axial alignment with the four freshly produced parts, which, at this time, have been partially ejected clear of their core pins. As will be described in greater detail below, at this time vacuum is supplied via the conduits 70, 68 to the interior of cups 66 to suck the parts P clear of the cores into the cups and to retain the parts within cups 66 during the subsequent elevating of rack assembly 56 as the platens are driven back to their closed position.

When the platens are in their closed position, the cups 66 have been elevated and moved to the right from the full line position shown in FIG. 1 to a broken line position shown in FIG. 1, at which time the cups and parts held therein are in adjacent opposed alignment with a pair of transfer chutes 74. As best seen in FIG. 2, transfer chutes 74 are located one above the other and are formed, on the side facing cups 66, with circular part receiving openings 76 through which the parts may be transferred from cups 66 into the interior of chutes 74. An air supply manifold 78 is connected to the left-hand end of chutes 74 to blow air through the chutes in a direction from left to right as viewed in FIG. 2 to blow the parts from chutes 74 through a common discharge opening 80 into the receiving end of a stationary pneumatic conveyor 82 located adjacent the molding machine. As best seen in FIG. 2, chutes 74 merge into a single chute at their right hand end. As will be described in greater detail below, the parts are discharged from the lower and upper chutes 74 sequentially, a blocking pin 84 being inserted into the upper chute temporarily to restrain the parts in the upper chute from entering into the merged section until after the parts conveyed by the lower chute 74 have been discharged into receiving conveyor 82. Pin 84 is carried on the piston 86 of a pneumatic motor 88, piston 86 being normally spring biased to a position where pin 84 is clear of the chute by a biasing spring 90.

With the exception of the fact that four parts P are formed simultaneously by the molding machine and the consequent fact that dual discharge chutes 74 are employed, the structure described thus far corresponds to that disclosed in the aforementioned Guest et al. application Ser. No. 135,926 now U.S. Pat. No. 3,734,666. The present invention is directed especially to improvements in the control circuitry for operating the transfer apparatus and to a sucker rod assembly designated generally 92 which is mounted upon and carried by carriage 40 and which is employed to achieve a more positive and efficient transfer of the parts P from cups 66 into chutes 74.

Referring first to FIG. 1, sucker rod assembly 92 includes a fixed frame 94 mounted on carriage 40. A pneumatic motor 96 is mounted upon the frame and its piston rod 98 is coupled to a square plate 100 to each corner of which is fixedly secured a sucker rod 102 which extends parallel to piston rod 98. Each of the sucker rod assemblies which include sucker rod 102 is identical to the others, hence only one will be described. Each sucker rod is slidably guided within a bushing 1041 carried on frame 94.

Figure 5:
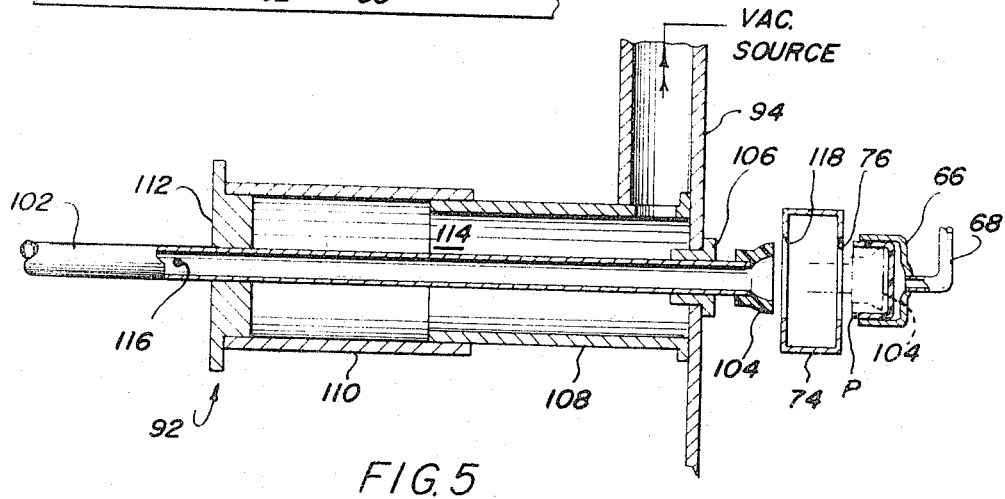
FIG. 5 is a detail cross sectional view of a portion of the sucker rod assembly.
Figure 4:
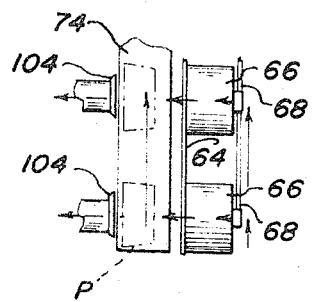
FIG. 4 is a detail plan view showing the relationship of the part holding cups to the pneumatic chute at the time the parts are ready to be transferred into the chutes.

Referring now to FIG. 5, it is seen that each of sucker rods 102 takes the form of a hollow tube which carries a resilient suction cup 104 at one end, the interior of cup 104 being in communication with the interior of sucker rod 102. A sealing bushing 106 in frame 94 supports the right hand end of the sucker rod for horizontal reciprocation. A first cylindrical section 108 is sealingly secured to the left side of the frame plate 94 and a second tubular section 110 is sealingly telescoped onto section 108 for axial adjustment. The outer end of cylindrical section 110 is closed by an end plate 112 which slidably and sealingly receives sucker rod 102. A vacuum source is in constant communication with the internal chamber 114 cooperatively formed by the two cylindrical sections 108 and 110. A bore 116 through the side wall of sucker rod 102 is so located to be clear to the left of end plate 112 when the sucker rod is in its fully retracted position shown in FIG. 5.

Returning briefly to FIG. 1, the piston of the sucker rod drive 96 is spring biased to the left as viewed in FIG. 1 to normally locate the sucker rods in the fully retracted position shown in FIGS. 1 and 5. When air under pressure is supplied via conduit 222 to the rod end of motor 96, the piston rod is driven to the right against the action of its biasing spring to drive plate 100 and all of the attached sucker rods 102 to the right.

Returning now to FIG. 5, it will be seen that as sucker rod 102 moves to the right, the bore 116 in its sidewall is carried through end plate 112 and eventually into the interior of chamber 114, at which time the vacuum existing in chamber 114 passes through bore 116 into the interior of rod 102. The rod is advanced to the right until its cup 104 comes into contact with the part P, at which time cup 104 seals itself to part P and the vacuum existing within the interior of rod 102 and cup 104 holds the part firmly against the cup. At this time, pressure to the sucker rod motor is vented and the spring biased piston against moves to the left, carrying the sucker rod to the left from its fully extended broken line position shown in FIG. 5. The part continues to be held upon cup 104 and moves with the cup back through receiving opening 76 in chute 74. At approximately the time that the part is fully within chute 74, opening 116 moves out of chamber 114, passes through cover plate 112 and becomes vented, thereby permitting the part to be stripped from cup 104 as the cup moves backwardly through the sucker rod opening 118 in chute 74.

Operation of the apparatus is most conveniently described in terms of the electrical, pneumatic and vacuum control circuitry.

CONTROL CIRCUITRY

A simplified schematic diagram of an electric control circuit for the apparatus is shown in FIG. 6. The circuit is most conveniently described in terms of its operation, and as a starting point, it will be assumed that the apparatus is at a point in its operating cycle just prior to the opening of the mold halves at a point in time at which the transferring of the last group of parts has been completed.

With the apparatus at the particular stage in its cycle referred to above, the platens and mold halves are closed and the normally open mold closed limit switch contacts MCLS in branch line B6 of the circuit are held closed, thus energizing two mold closed relays, MC2 of branch line B6 and MC of branch line B7. The limit switch which controls contacts MCLS is physically located in the mold drive control 30 and oriented so that contacts MCLS are closed only when the mold is closed and are open at all other times.

Referring now to branch lines B9 through B13, at this time contacts MCa of branch line B11 are closed and the sucker rod retract relay RER which was energized and locked in during the previous cycle by closure of its lock in contacts RERb is energized, this condition causing the sucker rods 102 to be in their retracted or inactive position shown in FIGS. 1 and 5.

During the preceding transfer cycle, the three timing relays RT1, RT2, RT3 were energized. The three timing relays are of the type where their various controlled contacts delay in shifting from their normal position shown in the diagram for a preselected time after energization of the controlling relay. At this time, contacts RT2a of line B13 are closed to lock in the timing relays in their energized condition, thus at this particular moment in time all of the RT contacts of FIG. 6 are in their off normal position. Thus, the cup shut off valve 204 is closed due to the fact that its solenoid 1–2 of branch line B18 is energized by the closure of contacts RT1a. The chute air valve 210 is also in its off position, its solenoid 2—2 of branch line B19 being de-energized by the opening of contacts RT3c, although contacts RT2c are closed at this time.

By virtue of the fact that sucker rod retract relay RER is energized at this time and the mold is closed, a circuit is completed across branch lines B16 and B17 which respectively energize the carriage-platen lock relay B2 and the cup supply control relay 1–4, energization of this latter relay connecting the pressure source through the pressure-vacuum valve 200, this pressure supply to the cups being blocked at this time because cup shut off valve 204 is closed.

Operation of the circuit in a normal or automatic mold is established by placing a selector switch SS in the indicated ON position. In practice, a single selector switch with the appropriate number of contacts is employed, however, for convenience and clarity in the diagram the single switch SS has been shown as several different switches, and it should be borne in mind that all of the switches SS are mechanically linked in practice so that all of their contacts are either in the ON or OFF position simultaneously.

With the apparatus in the condition described above, the next step in the process is for the mold to open under control of drive 30 to initiate the part transfer cycle. Opening of the mold immediately opens the mold closed limit switch contacts MCLS, thereby de-energizing mold closed relays MC and MC2. This action opens contacts MCa of branch B11, this action having no immediate effect upon the energized timing relays RT1, RT2, and RT3 because these relays remain energized via contacts RT2a in branch line B13 which are closed at this time. Opening of contacts MCa does, however, de-energize sucker rod retract relay RER. Contacts MCb and MCc also open upon the de-energization of relay MC, thus de-energizing the carriage-platen lock relay B2 and cup supply valve relay 1–4. The carriage-platen lock remains closed, however, the cup supply valve 200 shifts to establish the cup vacuum source connection at valve 200, however, this supply is blocked from the cups by the cup shut off valve 204 which remains closed at this time.

As the mold continues to open, cups 66 are driven downwardly toward their part receiving position. As the cups approach final alignment with the parts retained on the mold core pins, a proximity switch 205 (FIG. 1) is actuated to open its controlled contacts MPS in branch line B13, thus de-energizing and resetting the three timing relays RT1, RT2 and RT3. At this time, de-energization of the timing relays causes all of their contacts to resume the normal position shown in FIG. 6. Opening of contacts RT1a in branch line B18 de-energizes solenoid 1–2 which controls cup shut off valve 204 and opens this valve so that the vacuum which is now being passed through cup supply valve 200 is transmitted to cups 66 as the cups move into alignment with the parts supported on the mold core pins.

The parts are transferred to cups 66 and the mold halves begin to close, closing of the mold halves driving the cups upwardly clear of the closing mold.

As the mold halves return to their closed position, the cups arrive in alignment with part receiving openings 76 of chutes 74. Closing of the mold again closes contacts MCLS of branch B6 to energize the mold closed relays MC and MC2. Energization of relay MC2 closes contacts MC2a in branch line B8 to energize solenoid VS via normal closed contacts RERa, these latter contacts being closed at this time because relay RER is de-energized. Relay VS positions the sucker rod motor control valve 218 to supply pressure to sucker rod motor 96 to drive sucker rods 102 from their retracted position toward the parts held on cups 66.

Concurrently with the closing of contacts MC2a, contacts MCa in line B11 are closed to energize the timing relays RT1, RT2, and RT3 via contacts TORa and the normal closed contacts RT3b. Contacts TORa are controlled by a master relay TOR in branch line B1. During normal operation of the system in the automatic mode, relay TOR is energized at all times by the closed selector switch contacts in line B1 and normal closed contacts JUL2a which are opened only in the event of a jam in discharge chutes 74.

After relay RT1 has been energized a preselected period of time, it closes its contacts RT1a in branch line B18 to energize the cup shut off valve control relay 1–2. The time setting of relay RT1 determines the length of time during which pressure is supplied to cups 66 to blow the parts clear of the cups onto the extended sucker rods. Initiation of the supply of air under pressure to the cups is under the control of contacts MCc in branch line B17 which are closed concurrently with contacts MC2a and MCa above and contacts RERc which remain open until sucker rods 102 reach their fully extended position.

Energization of relay RT2 closes contacts RT2c in branch line B19 to supply air under pressure to chutes 74, this air supply being employed to blow the parts through the chutes after they have been transferred to the chutes by the retracting sucker rods.

Timing out of relay RT2 also closes contacts RT2a and RT2b in line B13, contacts RT2a providing a lock in to maintain the three timing relays energized upon the subsequent opening of contacts RT3b and contacts RT2d providing for a delay in the initial energization of relay RT3. Relay RT3 controls the time period during which air under pressure is supplied to the chutes 74. The chute air, controlled by relay 2—2 of line B19 is turned on when relay RT2 times out, timing out of relay RT2 commencing the energization of timing relay RT3 by closure of contacts RT2b. When relay RT3 times out, it opens contacts RT3c in branch line B19 to de-energize relay 2—2, thus terminating the supply of air to chutes 74.

Timing out of relay RT3 opens contacts RT3b in branch line B11, however the three relays remain energized via the now closed contacts RT2a of branch line B13.

When sucker rods 102 reach their forward limit of movement, limit switch contacts LSR of branch line B9 are closed to energize the sucker rod retract relay RER. When relay RER is energized, it closes its lock in contacts RERb of branch line B10 to maintain relay RER energized as contacts LSR are opened by the retraction of sucker rods 102. Contacts RERa are simultaneously opened to deenergize the sucker rod motor control valve VS which shifts positions and conditions the sucker rod motor 96 to retract the sucker rods, thus carrying the captured parts from the cups into the chutes 74.

At the same time, contacts RERc of line B17 are closed to energize the cup supply valve relay 1–4, thereby shifting this valve from its vacuum to its pressure supply position.

The control circuit is now in the initial condition described above and has completed one cycle.

In order to protect the system in the case of jamming of parts within chute 74, a jam up control system is constituted by the circuitry of branch lines B1–5 inclusive. The basic control element of this system is a jam up relay JUR in line B4 which is energized upon either of two jam up indicating conditions signalled by the contacts in line B4 or line B5.

In line B4, contacts RT3a, controlled by relay RT3 are in a normal open condition and close only upon the timing out of relay RT3. Contacts RT3a are in series with a second set of sucker rod control limit switch contacts LSR2 which are opened only when the sucker rod is retracted to a position beyond that at which it would have carried its parts into chutes 74. Should relay RT3 time out before the sucker rods have been fully retracted, contacts RT3a will close before the sucker rod position control contacts LSR2 are opened, and thus energize jam up relay JUR. Energization of relay JUR closes contacts JURa of line B3 to energize jam up latch relays JUL and JUL2, energization of relay JUL2 opening contacts JUL2a in branch line B1 to de-energize the master control relay. This action opens contacts TORa in branch line B11, thereby prohibiting de-energization of the timing relays during the next cycle.

Jam up relay JUR can also be energized by the photocell control contacts PC in line B5 which are set for a time delay closure when dark. Should the parts remain in the discharge chute for a time period longer than the delayed closure of contacts PC, relay JUR will be energized.

Figure 7:
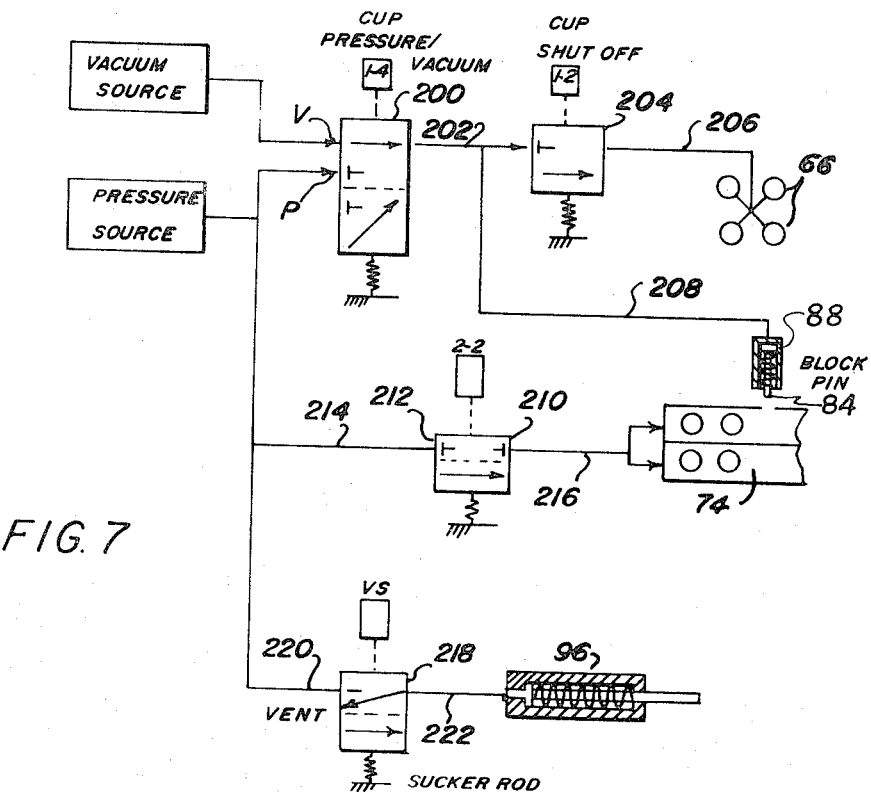
FIG. 7 is a schematic diagram of the pressure-vacuum system employed with the apparatus.
Figure 8:
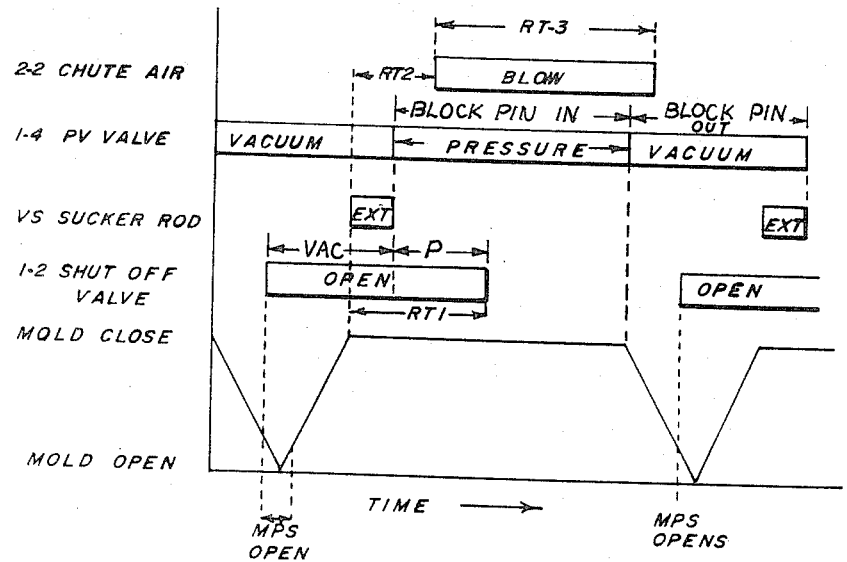
FIG. 8 is a timing diagram illustrating an operating cycle of the apparatus.

A schematic diagram of the pneumatic circuit which controls the supply of pressure or vacuum to the various operating element is shown in FIG. 7, while in FIG. 8 there is shown a timing diagram indicating the positions assumed by the various valves of FIG. 7 during the operating cycle of the apparatus.

In the penumatic control diagram of FIG. 7, the various valves are all shown in the position which they assume when their respective actuating solenoids are de-energized, in which case the valves are spring biased to the indicated position. Cup pressure-vacuum valve 200 is provided with two inlets, V and P connected respectively to a vacuum source and to a pressure source. Valve 200 has a single outlet 202 which is connected to the single inlet of cup shut off valve 204 whose outlet conduit 206 is manifold connected to the four part receiving cups 66 of the transfer mechanism. As indicated in the diagram, when the actuating solenoid 1–4 of cup pressure-vacuum valve 200 is de-energized, the connections within the valve are such that the vacuum at inlet port V is connected via valve 200 to its outlet conduit 202. Energization of solenoid 1–4 shifts the valve member to connect pressure at inlet P to conduit 202. When the actuating solenoid 1–2 of cup shut off valve 204 is de-energized, conduit 202 is blocked at the inlet of valve 204, thus preventing the transmission of vacuum or pressure from conduit 202 to cup manifold conduit 206. When solenoid 1–2 is energized, the valve member of shut off valve 204 is shifted to connect conduit 202 to conduit 206.

A branch conduit 208 is connected from conduit 202 to the head end of the block pin positioning motor 88.

The chute air control valve 210 is of a construction similar to that of cup shut off valve 204 and has its inlet 212 connected to a branch conduit 214 leading to the pressure source. The outlet of valve 210 is connected via conduit 216 to chutes 74. When the actuating solenoid 2—2 of valve 210 is de-energized, as shown in the drawings, pressure in conduit 214 is blocked by valve 210, when solenoid 2—2 is energized, the valve shifts to connect conduits 214 and 216 to each other to thereby supply air to chutes 74 to blow the parts through the chutes.

The sucker rod control valve 218 functions as a shut off valve which blocks branch conduit 220 and vents the sucker rod motor when its actuating solenoid VS is de-energized. When solenoid VS is energized pressure is supplied to the sucker rod motor. The inlet of valve 218 is connected via a branch conduit 220 to the pressure source; its outlet is connected via conduit 222 to the rod end of the spring loaded sucker rod motor.

Referring now particularly to the timing diagram of FIG. 8 in conjunction with the pneumatic diagram and the electrical schematic of FIG. 6, the timing diagram shows in graphical form the operation of the various valves during the part transfer cycle. The lowermost curve of FIG. 8 indicates the condition of the mold, the time line or abscissa of the diagram of FIG. 8 starting at a point in time where the mold is just beginning to open from its closed position. As indicated by the V-shaped portion of the curve immediately adjacent the ordinate, the mold moves uniformly to its opened position and reverses direction immediately upon reaching its fully open position to return to the mold closed position. The mold remains closed for a substantial period of time to accommodate the formation of the article being formed, and then opens again to initiate the next cycle. As indicated, the mold proximity switch contacts MPS (Branch line B13 of FIG. 6) are set to open at a point in time just prior to the mold reaching its fully opened position. Opening of contacts MPS resets all of the timer controlled contacts of FIG. 6, thus opening contacts RT1a (branch line B18) to de-energize cup shut off valve solenoid 1–2, thereby opening this valve. As indicated in the diagram of FIG. 8, the cup shut off valve remains open until relay RT1 times out.

The next action which takes place as the cycle proceeds occurs when the mold is restored to its closed position, at which time solenoid VS is energized, by the closure of contacts MC2a (branch line B8) to thereby shift sucker rod motor valve 218 to its open position, supplying air under pressure to the rod end of sucker rod motor 96 to drive rods 102 to their extended position. Because of the mechanical linkage between the mold platens and the part receiving cups, the cups at this time have arrived in aligment with the inlet openings of chutes 74. The sucker rods are thus free to drive toward their extended part receiving position. When the rods reach their fully extended position, limit switch LSR (branch line B9) closes to energize retract relay RER which opens contacts RERa in line B8, de-energizing solenoid VS to dump air from the sucker rod motor to permit the rod to retract. The period of time consumed by the extending of the sucker rods is indicated by the block EXT in the diagram of FIG. 8.

Arrival of the sucker rod at its fully extended position also closes contacts RERc (branch line B17) which with the now closed contacts MCc, closes because the mold is closed, energizes solenoid 1–4 to shift cup pressure/vacuum valve 200 from its vacuum position to supply pressure to conduit 202 and to blocking pin motor 88 to block the upper one of chutes 74. Pressure is supplied to conduit 202 from this point in time until the mold again starts to open, however, the supply of pressure to part holding cups 66 terminates when relay RT1 times out to close shut off valve 204.

The period during which chute air supply valve 210 remains open to supply air to the chutes is determined by the time setting of relays RT2 and RT3, relay RT2 determining the point in time at which the supply of chute air is started and relay RT3 determining the time at which valve 210 is de-energized to shut off the supply of air to the chute. It will be noted that chute air is not supplied until after the parts have been inserted into the chutes by the retracting sucker rods and that blocking pin 88 is withdrawn prior to de-energization of valve 210 so that parts in the upper chute which have been blocked by pin 84 can be blown past the retracted pin before the chute air is cut off.

While one embodiment of the invention has been described, it will be apparent to those skilled in the art that the disclosed embodiment may be modified. Therefore, the foregoing description is to be considered exemplary rather than limiting, and the true scope of the invention is that defined in the following claims.

We claim:

1. For use in combination with an article forming machine cyclically operable to form articles in pairs; article transfer apparatus comprising a pair of article transfer chutes each adapted to pass articles in single line therethrough and having an article receiving opening in one side thereof, said pair of chutes merging into a single chute conformed to pass articles in single line therethrough, pneumatic means operable when actuated to blow air through said pair of chutes toward and through said single chute to convey articles therethrough, cyclically operable transfer means synchronized with said machine for simultaneously transferring pairs of articles from said machine and inserting articles respectively into said pair of chutes through said receiving opening, first control means operable to actuate said pneumatic means to simultaneously blow said articles through said pair of chutes toward said single chute, and second control means on one of said pair of chutes upstream from the location at which said pair of chutes merge for blocking movement of articles from said one of said pair of chutes into said single chute until articles from the other of said pair of chutes have been conveyed into said single chute.

2. Article transfer apparatus as defined in claim 1 wherein said first control means actuates said pneumatic means for a predetermined time interval within each cycle of operation of said transfer means, and said second control means blocks movement of articles through said one of said pair of chutes during a first portion of said time interval and permits movement of articles through said chute during the second and final portion of said time interval whereby articles inserted into the other of said pair of chutes are blown into said single chute ahead of articles inserted into said one of said pair of chutes.

3. Article transfer apparatus as defined in claim 2 wherein said second control means comprises a blocking member movable between a retracted position clear of said one of said pair of chutes and a blocking position within said one of said pair of chutes, and blocking member positioning means operable to shift said blocking member to said blocking position simultaneously with the insertion of articles into said chute by said transfer means and to retract said blocking member to said retracted position prior to termination of actuation of said pneumatic means.

4. Article transfer apparatus as defined in claim 3 wherein said blocking member positioning means comprises a pneumatic motor normally positioning said blocking member in said retracted position and operable when supplied with pressure to locate said blocking member in said blocking position, a source of pressure, said pneumatic means including first valve means operable to place said chutes in communication with said source and said second control means including second valve means operable to place said pneumatic motor in communication with said source.

5. Article transfer apparatus as defined in claim 4 further comprising a vacuum source, said transfer means having article engaging elements thereon operable when supplied with vacuum to hold an article on said engaging element and operable when supplied with pressure to eject an article from said engaging element, said second valve means having a first inlet connected to said source of pressure and a second inlet connected to said vacuum source and an outlet connected to said pneumatic motor, conduit means connecting said outlet to said article engaging element, first relay means coupled to said second valve means operable when energized to connect said first inlet to said outlet and operable when de-energized to connect said second inlet to said outlet whereby said blocking pin is shifted by said pneumatic motor to said blocking position simultaneously with the ejection of articles from said engaging elements.

6. Article transfer apparatus comprising a pair of first pneumatic conveyors merging into a single second pneumatic conveyor, each of said first and second conveyors being operable to convey articles in single line therethrough, transfer means for simultaneously loading an equal number of articles into both of said first conveyors, pressure responsive blocking means mounted on one of said first conveyors at a location between the loading location at which said transfer means loads articles therein and the merging location at which said one of said first conveyors merges with said second conveyor operable when supplied with pressure to block movement of articles through said one of said first conveyors to said merging location, a source of air under pressure, first control means responsive to the loading of articles into said first conveyors by said transfer means for connecting said blocking means to said source of pressure, and second control means for connecting said source of pressure to said first conveyors to blow articles therethrough after said articles have been loaded into said first conveyors, timing means for disconnecting said source of pressure from said first conveyors after predetermined time interval, and means in said first control means for disconnecting said blocking means from said source of pressure prior to the expiration of said time interval.

* * * * *